United States Patent
Poosapalli et al.

(10) Patent No.: US 11,954,498 B2
(45) Date of Patent: Apr. 9, 2024

(54) DYNAMIC OPERATION CODE BASED AGNOSTIC ANALYSIS OF INITIALIZATION INFORMATION

(71) Applicant: Dell Products L.P., Round Rock, TX (US)

(72) Inventors: Karunakar Poosapalli, District Medak (IN); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 135 days.

(21) Appl. No.: 17/671,873

(22) Filed: Feb. 15, 2022

(65) Prior Publication Data

US 2023/0259366 A1 Aug. 17, 2023

(51) Int. Cl.
*G06F 9/44* (2018.01)
*G06F 9/4401* (2018.01)

(52) U.S. Cl.
CPC .................. *G06F 9/4403* (2013.01)

(58) Field of Classification Search
CPC ..................................................... G06F 9/4403
See application file for complete search history.

(56) References Cited

U.S. PATENT DOCUMENTS

| | | | |
|---|---|---|---|
| 10,146,606 B2 | 12/2018 | Onniyil et al. | |
| 10,990,411 B2 | 4/2021 | Zhu et al. | |
| 2008/0162675 A1* | 7/2008 | Bolay | G06F 9/44505 709/221 |
| 2009/0259835 A1* | 10/2009 | Perng | G06F 9/4411 713/1 |
| 2010/0205422 A1* | 8/2010 | Shao | G06F 9/4403 713/100 |
| 2011/0154009 A1* | 6/2011 | Harmer | G06F 9/4401 713/1 |
| 2015/0261520 A1* | 9/2015 | Hsu | G06F 8/65 713/1 |
| 2021/0240487 A1 | 8/2021 | Vidyadhara et al. | |

* cited by examiner

*Primary Examiner* — Zahid Choudhury
(74) *Attorney, Agent, or Firm* — Larson Newman, LLP

(57) ABSTRACT

An information handling system determines a difference between a first set of initialization information and a second set of initialization information during a pre-extensible firmware interface initialization phase of a boot process that is based on a first basic input/output system (BIOS), wherein the first set of initialization information is associated with the first BIOS and the second set of initialization information is associated with a second BIOS. The system also creates and publishes a hand-off block that includes an entry which describes the difference between the first set of initialization information and the second set of initialization information. The system parses the hand-off block during a driver execution environment phase to determine the difference between the first set of initialization information and the second set of initialization information, wherein the hand-off block is passed from the pre-extensible firmware interface initialization phase of the boot process. The system then updates the first set of initialization information based on the difference during the driver execution environment phase before continuing the boot process with the second BIOS using updated initialization information.

20 Claims, 5 Drawing Sheets

US 11,954,498 B2

DYNAMIC OPERATION CODE BASED AGNOSTIC ANALYSIS OF INITIALIZATION INFORMATION

FIELD OF THE DISCLOSURE

The present disclosure generally relates to information handling systems, and more particularly relates to dynamic operation code based agnostic analysis of initialization information.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system determines a difference between a first set of initialization information and a second set of initialization information during a pre-extensible firmware interface initialization phase of a boot process that is based on a first basic input/output system (BIOS), wherein the first set of initialization information is associated with the first BIOS and the second set of initialization information is associated with a second BIOS. The system also creates and publishes a hand-off block that includes an entry which describes the difference between the first set of initialization information and the second set of initialization information. The system parses the hand-off block during a driver execution environment phase to determine the difference between the first set of initialization information and the second set of initialization information, wherein the hand-off block is passed from the pre-extensible firmware interface initialization phase of the boot process. The system then updates the first set of initialization information based on the difference during the driver execution environment phase before continuing the boot process with the second BIOS using updated initialization information.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
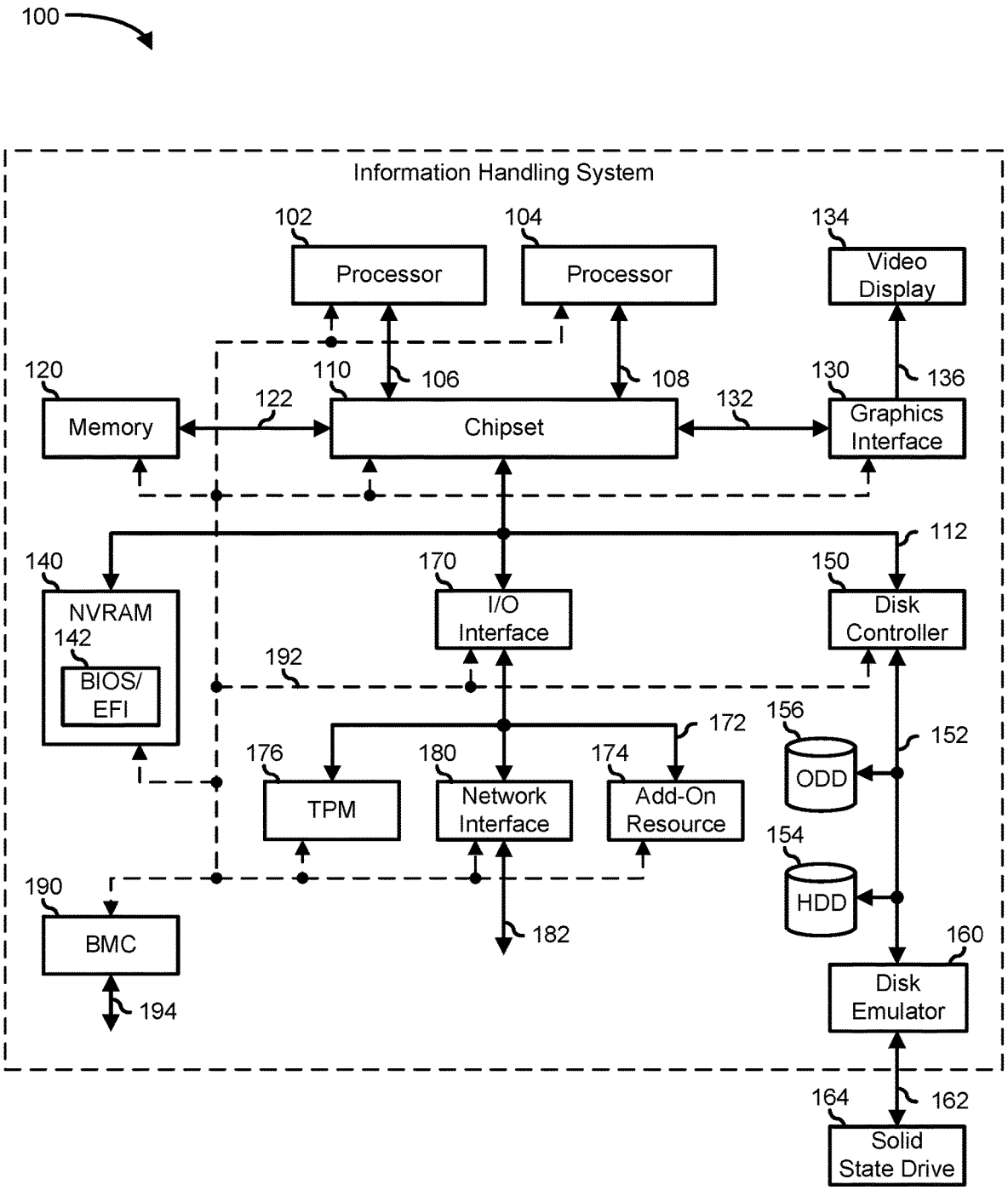
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NVRAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface, a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

The BIOS generally includes a reference code that may be a combination of different hardware initialization, memory management, and low-level chipset code. BIOS and/or reference code updates may be released to update chipset code initialization to address security vulnerabilities, feature enhancements, boot time optimization and so on. Typically, when there is an update to the reference code, the platform configuration settings and setup configuration settings may be updated among others. In some instances, the information handling system may encounter a system hang during the reference code update or roll back for a variety of reasons. For example, the system hang may happen at memory initialization because of a change in a setup variable offset. Currently, there is no mechanism to roll back to a previous version of the reference code when such system hang happened.

Figure 2:
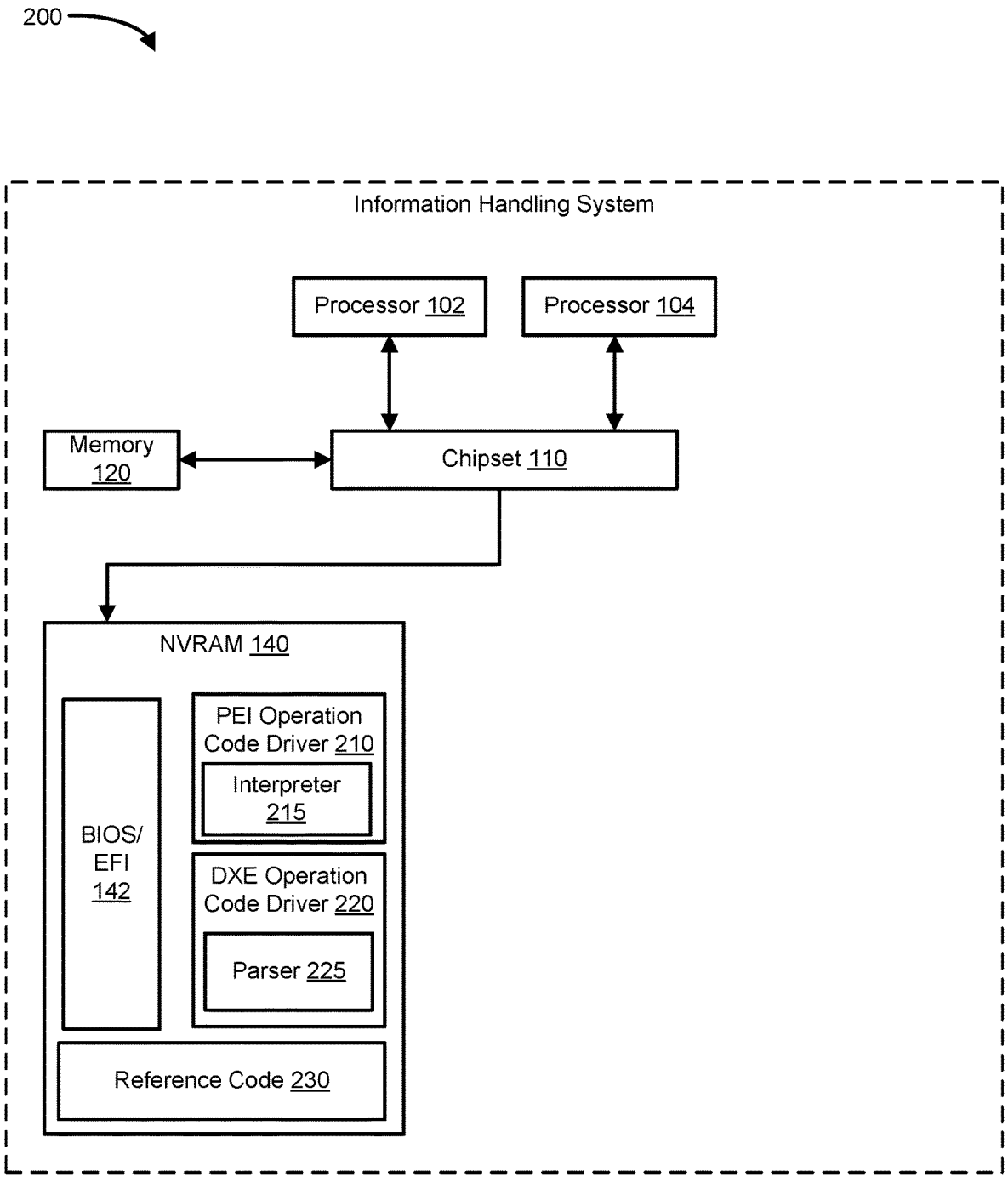
FIG. 2 is a block diagram illustrating an example platform architecture that may exist on an information handling system for dynamic operation code based analysis of initialization information, according to an embodiment of the present disclosure.

FIG. 2 shows an example of a platform architecture that may exist on an information handling system 200 for dynamic operation code based agnostic analysis of initialization information. The information handling system 200, which is similar to information handling system 100, includes processors 102 and 104, chipset 110, memory 120, and NV-RAM 140. NV-RAM 140 includes BIOS/EFI module 142, a pre-EFI initialization (PEI) operation code driver 210, a driver execution environment (DXE) operation code driver 220, and a reference code 230. PEI operation code driver 210 includes interpreter 215. DXE operation code driver 220 includes a parser 225. In various embodiments, information handling system 200 may not include each of the components shown in information handling system 100 of FIG. 1.

Reference code 230 may include information that relates to memory initialization in the BIOS. For example, reference code 230 includes information about memory settings, frequency, timing, driving, and detailed operations of the memory controller. Reference code 230 also provides support for initialization information which includes setup initialization settings, platform configuration settings, chipset initialization code, memory initialization/configuration settings, etc.

PEI operation code driver 210 may be configured to determine differences in a set of initialization information between two versions of BIOS and/or reference codes. A first version of the BIOS and/or reference code may be a current version also referred to as a base version of the BIOS and/or reference code. The second version may be a version that is newer or older, wherein the base version may be updated or rolled back to accordingly. PEI operation code driver 210 may also determine differences associated with the initialization information such as structure definitions, memory structure, offset values, etc. The PEI operation code driver 210 may create, update, and/or publish one or more hand-off blocks that describe the determined differences. The PEI operation code driver 210 may also determine the differences in the memory structure, such as whether an offset associated with a setup initialization setting, platform configuration settings has changed and make adjustments accordingly, such as when an entry is added or removed from the setup initialization settings and/or platform configuration settings.

For example, platform configuration settings such as Intel® platform configuration database (PCD) include static and dynamic settings. The dynamic platform configurations settings may be changed during the boot process and accordingly its associated offset(s). If the offset of a particular dynamic platform setting that is associated with a version of the BIOS and/or reference code is different than the current version of the BIOS and/or reference code then there is an offset mismatch between the two versions which may cause the update/rollback to fail or a system hang to occur. To mitigate this issue, PEI operation code driver 210 may "adjust" the offset value prior to the update or roll back to accommodate the offset value associated with the version of the BIOS and/or reference code to be updated or rolled back to. Interpreter 215 may perform the adjustment to the offset(s) and add/update a hand-off block accordingly.

In another example, PEI operation code driver 210 may be configured to determine whether there is a change in the structure definition associated with the initialization information. In yet another example, PEI operation code driver may determine if there is a change in the entries associated with the initialization information, such as whether an entry has been added and/or deleted from the setup initialization settings, platform configuration settings, chipset initialization code, etc.

Based on the determined difference, PEI operation code driver 210 may create and publish one or more hand-off blocks that describes the aforementioned difference a PEI initialization phase of the boot process. The PEI operation code driver may add and/or update an entry to the hand-off block that includes information associated with the difference such as version number of BIOS and/or reference code and a mapping of the data that has been changed between the two versions. For example, the hand-off block may include the current offset and new offset and other information such as identifier of the associated initialization information. The hand-off blocked may be consumed by DXE operation code driver 220 during the DXE phase.

PEI operation code driver 210 may save a copy of the initialization information associated with the current version of the BIOS and/or reference code before the update or rollback. For example, PEI operation code driver 210 may copy the setup configuration setting entries before the update, including their variables, values, and associated offsets. PEI operation code driver 210 may be configured to determine or detect differences in the entries such as whether there are differences in variables and/or data values associated with the entries. PEI operation code driver 210 may update the variables and/or the values to their default values. PEI operation code driver 210 may also update the value of the offsets. Similarly, PEI operation code driver 210 may save a copy of the information associated with the platform configuration settings and/or the chipset code.

PEI operation code driver 210 may also determine the differences between the PEI and/or DXE drivers of the two versions of the BIOS and/or reference code. In addition, PEI operation code driver 210 may determine if there are changes to the memory controller initialization values. Based on the differences, PEI operation code driver 210 may update the setup variable offsets, wherein PEI operation code driver 210 may save a copy of the old reference code setup variable and offset values. PEI operation code driver 210 may create and publish one or more hand-off blocks based on determined differences, wherein the hand-off blocks may be consumed during the DXE phase.

DXE operation code driver 220 includes a parser 225 which may be configured to parse one or more hand-off blocks published by PEI operation code driver 210. DXE operation code driver 220 may determine the differences based on the parsed data and bridge the difference(s) between the two versions of the BIOS and/or reference code, such that the information handling system may continue to boot with the updated initialization settings. For example, DXE operation code driver 220 may update the structure definition, chipset initialization code, setup configuration settings, platform configuration settings, memory structure, drivers, etc. DXE operation code driver 220 may save a copy of the user's environment and/or configuration settings. Also, DXE operation code driver 220 may also save a copy of the data structure of the setup configuration settings and the platform configuration settings. In addition, DXE operation code driver 220 save a copy of the NV-RAM setup values, complementary metal-oxide-semiconductor (CMOS) values, etc. Once the BIOS and/or reference code update or rollback is successful, the user environment and/or configuration settings may be rolled back. In another example, the default settings associated with the initialization information may be rolled back to recover the information handling system on system boot failure such as during the BIOS and/or reference code update.

The components of information handling system 200 may be implemented in hardware, software, firmware, or any combination thereof. Additionally, or alternatively, information handling system 200 may include various additional components in addition to those that are shown. Furthermore, some components that are represented as separate components may in certain embodiments instead are integrated with other components. For example, in certain embodiments, all or a portion of the functionality provided by the illustrated components may instead be provided by components integrated into one or more processor(s) as a system-on-a-chip. For purposes of this disclosure, the EFI and unified extensible firmware interface (UEFI) are used interchangeably and may be called UEFI for simplicity. Also, as used herein, legacy BIOS, as well as UEFI BIOS, are referred to as BIOS for simplicity. In addition, the components shown are not drawn to scale and information handling system 200 may include additional or fewer components. Also, connections between components may be omitted for descriptive clarity.

Figure 3:
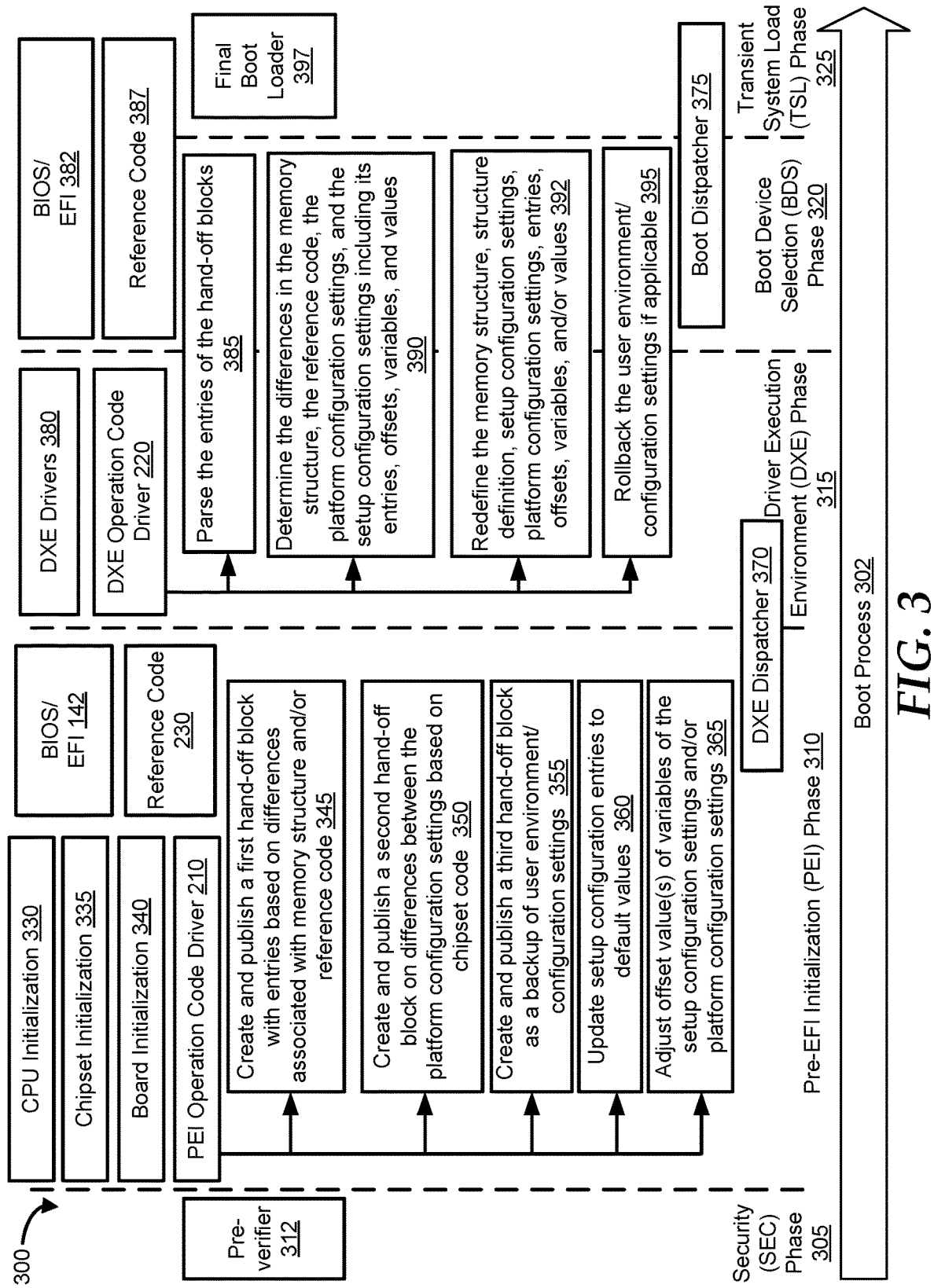
FIG. 3 is a block diagram illustrating an example boot process that can be performed on an information handling system for dynamic operation code based analysis of initialization information, according to an embodiment of the present disclosure.

FIG. 3 illustrates a boot phase diagram 300 for an information handling system that is operating using UEFI, wherein the information handling system is similar to information handling system 200 of FIG. 2. The boot phase diagram 300 includes a security (SEC) phase 305, a PEI phase 310, a DXE phase 315, a boot device selection (BDS) 320, and a transient system load phase (TSL) phase 325. The PEI phase 310 includes an operation code layer that is based on a first chipset code initialization.

The SEC phase 305 is the first phase of a UEFI boot process that operates to set up a pre-verifier 312 that handles restart events on the information handling system and temporarily allocates a portion of memory for use during the other boot phases. The pre-verifier 312 passes execution to the PEI phase 310 that executes a PEI core that includes a CPU initialization 330, a chipset initialization 335, and a board initialization 340. During PEI phase 310, reference code 230 may also be executed to initialize the system memory. PEI phase 310 may perform the above functions using BIOS/EFI module 142. PEI phase 310 includes an operation code transition layer with a PEI operation code driver 210 that handles changes or differences in the BIOS and/or reference codes during an update or rollback. For example, PEI operation code driver 210 handles differences between a first set of initialization information and a second set of initialization information, wherein the first set of initialization information is associated with BIOS/EFI 142 and reference code 230, and wherein the second set of initialization information is associated with BIOS/EFI 382 and reference code 387. BIOS/EFI 142 may be updated or rolled back to BIOS/EFI 382, wherein BIOS/EFI 382 may be newer or older version of BIOS/EFI 142 accordingly. Similarly, reference code 230 may be updated or rolled back to reference code 387.

For example, PEI operation code driver 210 may handle changes to the data structure of the setup configuration settings like changes to the definition, entries, variables, and/or value. In addition, PEI operation code driver 210 may handle changes to the chipset code, reference code, memory structure. If there is a change to the structure of the setup configuration settings such as when an entry is added or deleted, an offset may change and impact other entries. Because of the change in the offset, user configuration and/or environment settings may also be affected. Currently, there is no mechanism to address the change in the offset which may lead to a system hang.

In particular, PEI operation code driver 210 may be configured to perform blocks 345, 350, 355, 360, and 365 during the PEI phase 310. At block 345, PEI operation code driver 210 may be configured to generate a data structure, such as a first hand-off block that includes the differences associated with the memory structure and/or reference code. PEI operation code driver 210 may also determine differences of PEI drivers after an update or rollback of the chipset initialization code. The PEI operation code driver 210 may determine if there are differences in the setup configuration settings, memory structure, reference code, etc. PEI operation code driver 210 may then add each of the differences as an entry in the first hand-off block. PEI operation code driver 210 may also update an existing entry in the first hand-off block.

In particular, PEI operation code driver 210 may determine if there are differences in the structure, definition, variable, and/or values associated with the setup configuration settings, BIOS image, and the reference code. For example, PEI operation code driver 210 may determine whether there is a change to the setup configuration settings such as whether there an entry has been added, updated, or removed. PEI operation code driver 210 may also determine whether the structure definition of an entry in the setup configuration settings has changed and/or whether there is a change in the variable of an entry and/or a change in the value. For example, in Intel® the setup configuration settings include the following EFI variable store entries: SETUP_DATA, CPU_SETUP, ME_SETUP, PCH_SETUP, SI_SETUP, etc. PEI operation code driver 210 may determine whether SETUP_DATA has been changed from an EFI variable store to another data structure such as a variable store.

At block 350, the PEI operation code driver 210 may determine changes or differences in the platform configuration settings based on changes on the chipset initialization code and/or chipset code structure. For example, the PEI operation code driver 210 may determine the changes between the current version of the chipset code and a newer or previous version of the chipset code to be updated or rolled back to accordingly. PEI operation code driver 210 may determine if there are differences in the structure, definition, variable, and/or values associated with the platform configuration settings and the chipset code structure. PEI operation code driver 210 may be configured to generate a data structure, such as a second hand-off block that describes the differences associated with the platform configuration settings and/or chipset code. PEI operation code driver 210 may then add each of the differences as an entry in the second hand-off block. PEI operation code driver 210 may also update an existing entry in the second hand-off block.

At block 355, PEI operation code driver 210 may create and publish a third hand-off block with entries associated with a backup of the current user environment and/or configuration settings. For example, PEI operation code driver 210 may take a backup of the user's setup configuration associated with the NVRAM, setup values, CMOS values, etc.

At block 360, PEI operation code driver 210 may initialize a value in one or more entries in the hand-off blocks to its default value before the update or rollback of the BIOS and/or reference code. If there is a new entry, then the PEI operation code driver 210 may initialize the values of the added entry to its default values. The default values can be stored in the NVRAM and then copied into system memory. By initializing and/or updating the values to their default may prevent issues during the boot process or customer setup.

At block 365, PEI operation code driver 210 may adjust an offset value(s) of one or more variables of the setup configuration settings and/or platform configuration settings. The offset value(s) associated with the BIOS image and/or reference code may change between the first and second versions. For example, the addition or removal of entries in the setup configuration settings, platform configuration settings, memory structure, etc. may change the associated offsets. For example, if there is a change in a setup configuration setting, such as when an entry is added or removed, the offset associated with each of the other entries and/or its variables may change. PEI operation code driver 210 may adjust the offset values according to the second BIOS image and/or reference code. For example, the offset values may be adjusted based on the second structure definition. Because a change in an offset may cause the information handling system to hang and/or affect the user environment and/or configuration settings, an adjustment to the offset may be performed by the PEI operation code driver 210 according to the structure definition and/or memory structure of the BIOS and/or reference code update/rollback.

During DXE phase 315, DXE dispatcher 370 may be configured to discover and execute DXE drivers 380 and DXE operation code driver 220. DXE operation code driver may be configured to perform blocks 385, 390, 392, and 395. The DXE phase 315 includes an operation code layer that is based on a first chipset code initialization and a second chipset code initialization for DXE and/or system management mode (SMM) drivers. Also, DXE operation code driver 220 may implement a bridge BIOS that includes differences between the base setup configuration settings and/or the base platform configuration database. The DXE operation code driver 220 may be configured to update the initialization information based on BIOS/EFI module 142 and reference code 230 to conform with BIOS/EFI 382 and reference code 387.

At block 385, DXE operation code driver 220 may read and parse entries in the hand-off blocks passed from PEI phase 310. DXE operation code driver 220 may read the BIOS/EFI module 142 that has been flashed in NV-RAM 140. DXE operation code driver 220 may read the second BIOS image, such as BIOS/EFI 382 which may be stored in a storage device such as a USB, HDD, SSD, etc.

At block 390, based on the parsed information, DXE operation code driver 220 may determine the differences between the set of initialization information such as the memory structure, reference code, platform configuration settings, setup configuration settings, memory structure, drivers, etc. between the first BIOS/reference code and the second BIOS/reference code. In addition, DXE operation code driver 220 may also determine if there are differences in the structure definition, entries, variables, values, and offsets. For example, DXE operation code driver 220 may compare the base PEI drivers, wherein the base PEI drivers are associated with the first BIOS/reference code with PEI drivers associated with a second BIOS/reference code. In particular, DXE operation code driver 220 may compare PEI drivers associated with BIOS/EFI module 142 with the PEI drivers associated with BIOS/EFI 382.

At block 392, DXE operation code driver 220 may redefine or update the first initialization settings to according to the second initialization settings. For example, DXE operation code driver 220 may update memory structure and structure definition based on the adjustment to one or more offsets. Also, DXE operation code driver 220 may adjust the reference code, platform configuration settings, setup configuration settings, structure definition, drivers, etc. according to the BIOS/EFI 382 and/or reference code 387. For example, if the PEI drivers are different, the DXE operation code driver 220 makes a BIOS version entry in the operation code translation layer for the PEI phase 310. If the BIOS DXE drivers are different, then DXE operation code driver 220 may make a DXE BIOS version entry in the operation code layer. DXE operation code driver 220 may also update the offsets based on the differences in the memory structure and/or structure definition.

At block 395, DXE operation code driver 220 may roll back user environment and/or configuration settings after the update or roll back to the second BIOS image and/or reference code. DXE operation code driver 220 may roll back the user environment and/or configuration settings based on the structure definition of the second memory code reference. For example, the DXE operation code driver 220 may update or roll back NVRAM settings, CMOS values, setup configuration variables and/or its values, etc.

DXE phase 315 passes execution to BDS phase 320 which executes boot dispatcher 375. BDS phase 320 passes execution to TSL phase 325 which executes final boot loader 397. TSL phase 325 continues execution of boot process 302 based on updated set initialization information based on BIOS/EFI 382 and reference code 387.

Those of ordinary skill in the art will appreciate that the configuration, hardware, and/or software components of information handling system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description. Although the present disclosure refers to BIOS and reference code update/rollback in the discussion, the UEFI capsule update/rollback may use the same operation code translation layer in performing the methods and/or functions disclosed herein.

Figure 4:
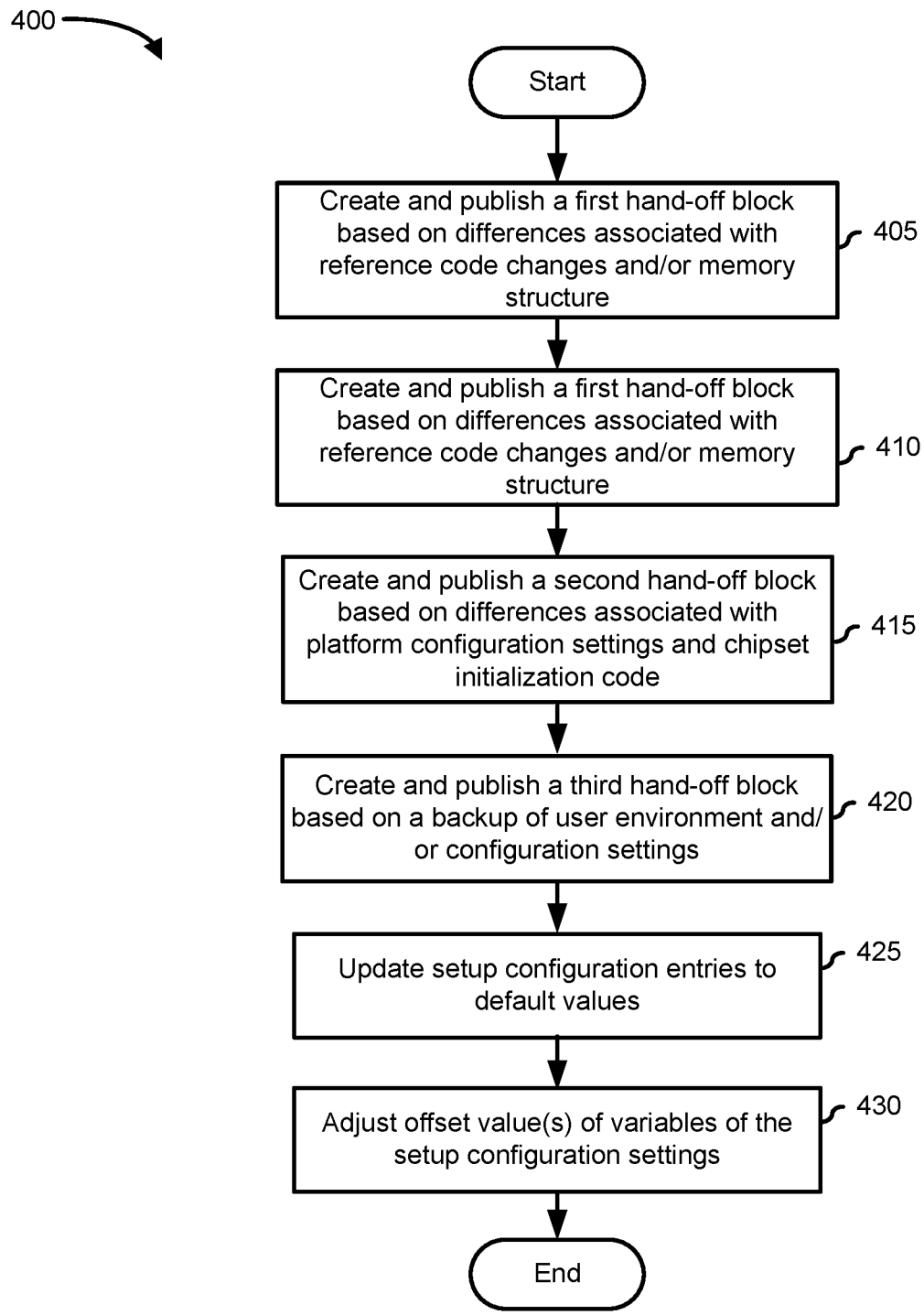
FIG. 4 is a flowchart illustrating an example of a method that can be performed on an information handling system for dynamic operation code based analysis of initialization information, according to an embodiment of the present disclosure.

FIG. 4 shows an example of method 400 for dynamic operation code based agnostic analysis of initialization information. Method 400 may be performed by a PEI operation code driver 210 of FIG. 2 in the operation code translation layer. However, while embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

Method 400 typically starts at block 405 where the method may determine differences between the first set of initialization information and the second set of initialization information. Each set of initialization information includes setup configuration settings, platform configuration information, memory structure, and user environment and/or configuration settings. The set of initialization information includes data associated with the aforementioned such as offset, structure definition, variables, and data values. The first set of initialization information may be associated with a base BIOS image and reference code. The second set of initialization information may be associated with the BIOS image and reference code that the base is to be updated or rolled back to.

At block 410, the method may create and publish a first hand-off block based on differences between the first set of initialization information and the second initialization information determined herein. For example, the method may determine differences associated with reference code changes and/or memory structure. The method may also determine changes to memory controller initialization or structure definitions. In addition, the method may determine the reference code changes for the PEI drivers before and after update/rollback to another chipset initialization code. The method may determine changes in the memory structure, reference code, setup configuration settings, etc. The first hand-off block may also be published to be consumed during the DXE phase.

At block 415, the method determines differences in the chipset code structure, chipset initialization code, platform configuration settings, etc. between the first and second BIOS and/or reference code. The method may create and publish a second hand-off block based on the determined differences. Similar to block 405, if there is an additional entry in the platform configuration settings, and then the method may initialize the value associated with the additional entry to a default value. In addition, the method may adjust the offset accordingly, such as when there is a change to the structure definition, an additional entry, and/or an entry that was deleted from the platform configuration settings and/or chipset initialization code.

At block 420, the method takes a backup of the user's environment and/or configuration settings. The method may take the backup before an update or recovery of the BIOS is triggered. At block 425, the method may determine if there are changes in the structure and/or structure definition of the setup configuration settings, platform configuration settings, BIOS, drivers, reference code, etc. In addition, the method may determine if there is an entry added to and/or deleted from the aforementioned. If there is an entry added to and/or deleted from the aforementioned, then the method may initialize the value(s) of the variables associated with the entry to its default value(s).

At block 430, the method may determine if there is a new entry and/or an entry deleted from the setup configuration settings, platform configuration settings, and/or reference code, then the method may determine if there is a change in the offset associated with the entries. If there is a change in the offset associated with one or more entries in the setup configuration settings, platform configuration settings, and/or reference code, then the method may adjust the offset. The method may determine differences in the structure of the setup configuration settings, platform configuration settings, and/or reference code. Adjusting the offset may include saving a copy of the first setup configuration settings and/or the first reference code variables and offset values. The method may adjust the value of the offset according to the second structure definition based on the structure difference and/or difference in the offset.

Figure 5:
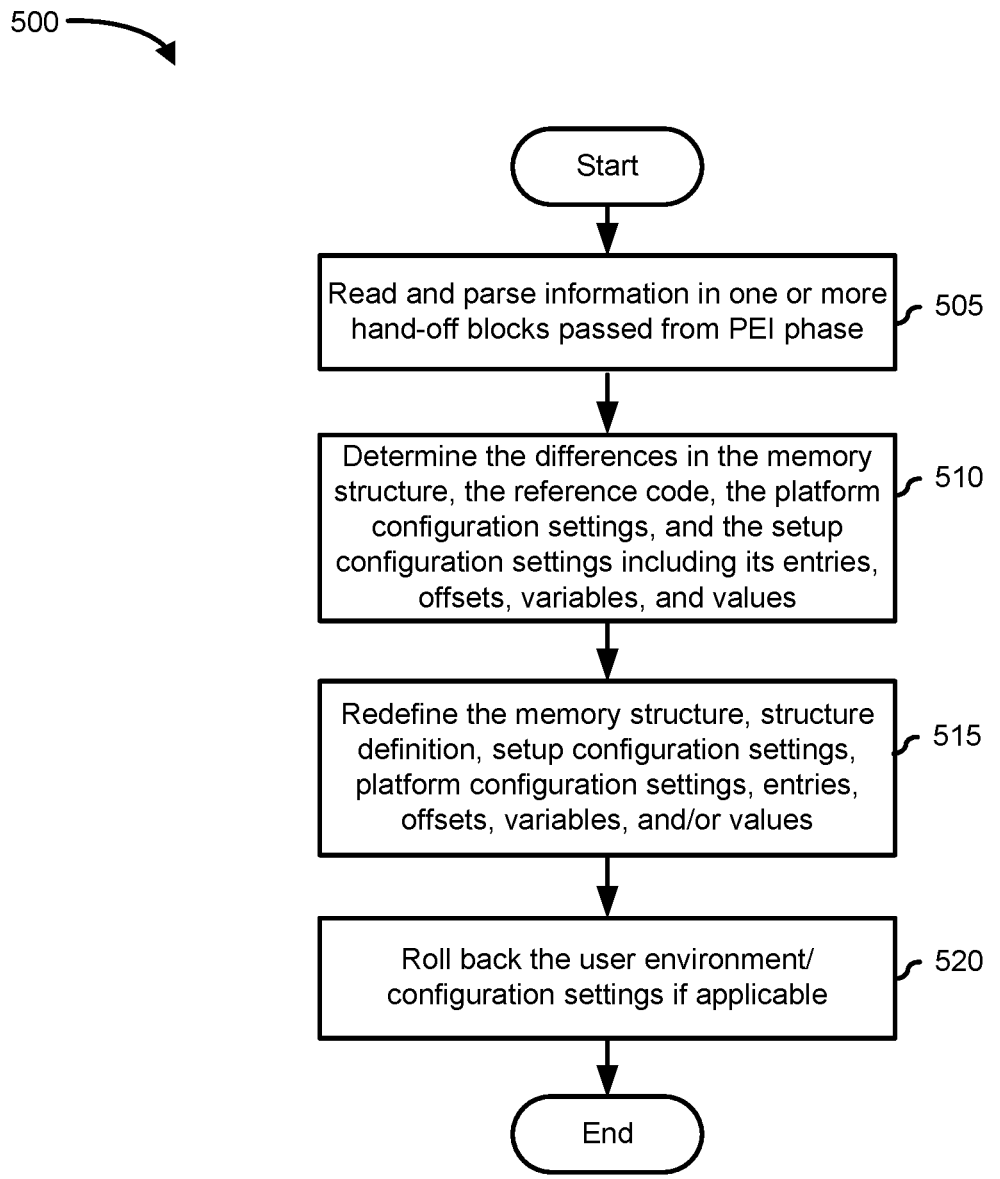
FIG. 5 is a flowchart illustrating an example of a method that can be performed on an information handling system for dynamic operation code based analysis of initialization information, according to an embodiment of the present disclosure.

FIG. 5 shows an example of a method 500 for dynamic operation code based agnostic analysis of initialization information. While the PEI phase includes an operation code translation layer that is based on a first BIOS and/or reference code which includes a base chipset initialization code, the DXE phase may include an operation code translation layer that is based on a second BIOS and/or reference code. The first BIOS and/or reference code may also be referred to as a base BIOS and/or reference code which is currently stored in the SPI flash or the NV-RAM. The second BIOS and/or reference code is what the first BIOS and/or reference code is to be updated or rolled back to. Method 500 may parse the one or more hand-off blocks that describe the differences between the first set of initialization information and the second set of initialization information. Method 500 may determine the differences based on the parsed information and update the initialization information to conform to the second set of initialization information and continue with the boot process to update/roll back to the second BIOS and/or reference code using the updated initialization information.

Method 500 may be performed by a DXE operation code driver 220 of FIG. 2 in the operation code translation layer. However, while embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

Method 500 occurs during the DXE phase and typically starts at block 505 where the method may read and parse the information in one or more hand-off blocks passed from the PEI phase. The hand-off block may have been created and published at block 405 of FIG. 4. At block 510, the method may determine the differences in the memory structure, the reference code, the platform configuration settings, and the setup configuration settings including its entries, offsets, variables, and values based on the information parsed from one or more hand-off blocks. For example, the method may determine the differences in the reference code as the reference code in the DXE phase may be newer or older than the reference code in the PEI phase.

At block 525, the method may read the information in the current BIOS image also referred to as a base BIOS image at the NV-RAM. The method may also read the information in the BIOS recovery or update image, also referred to as a new BIOS image, at a storage device such a USB, HDD, SSD, or the like. As referred herein, the new BIOS image may have an older or newer version than the base BIOS image. The method may read the BIOS using a firmware management protocol. After reading the information in both BIOS images, the method may compare the PEI drivers in the base BIOS image with the PEI drivers in the new BIOS image. If there is a difference between the PEI drivers, make a PEI BIOS version entry to the operation code layer. The method may also compare the DXE drivers between the base BIOS image and the new BIOS image. If there is a difference between the DXE drivers in the base BIOS image and the DXE drivers in the new BIOS image, then the method may make a DXE BIOS version entry in the operation code layer.

If there is a difference found in the PEI drivers and/or DXE drivers, then the method may update the new setup structure, structure definition, and/or platform configuration database based on the difference. The method may also save a copy of the user's environment and/or configuration settings such as setup structure data values, platform configuration database, and/or CMOS values. If the BIOS update or recovery is successful, the method may roll back the user's environment and/or configuration settings.

At block 515, the method may redefine or update the memory structure, offset, structure definition, setup configuration settings, platform configuration settings, entries, variables, and/or values. Based on the information in the hand-off block, the method may update one or more entries in the setup configuration settings and/or the platform configuration settings. For example, the method may add, or remove an entry. The method may also update the entry by updating the variable, value, and/or offset associated with the entry. The update may be based on the second BIOS image and/or reference code.

At block 515, the method may implement a bridge BIOS firmware that includes the delta associated with the reference code which may be based on the setup structure and/or the platform configuration database. The setup configuration data structures and their entries may be updated based on the second memory reference code.

At block 520, after the BIOS update or recovery, the method may roll back customer environment and/or configuration settings. For example, the method may roll back the NV-RAM settings, setup structure variables, or CMOS values when a system corruption occurs because of changes in the NV-RAM variable, setup configuration settings causing a boot failure.

Although FIG. 4, and FIG. 5 show example blocks of method 400 and method 500 in some implementation, method 400 and method 500 may include additional blocks, fewer blocks, different blocks, or differently arranged blocks than those depicted in FIG. 4 and FIG. 5. Those skilled in the art will understand that the principles presented herein may be implemented in any suitably arranged processing system. Additionally, or alternatively, two or more of the blocks of method 400 and method 500 may be performed in parallel. For example, block 420 and block 425 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    determining, by a processor, a difference between a first set of initialization information associated with a first basic input/output system (BIOS) and a second set of initialization information associated with a second BIOS during a pre-extensible firmware interface initialization phase of a boot process, wherein the first set of initialization information is further associated with a first reference code and the second set of initialization information is further associated with a second reference code;
    creating and publishing a hand-off block that includes an entry which describes the difference between the first set of initialization information and the second set of initialization information;
    parsing the hand-off block during a driver execution environment phase to determine the difference between the first set of initialization information and the second set of initialization information;
    updating the first set of initialization information based on the difference during the driver execution environment phase to conform with the second BIOS and the second reference code and if there is an additional entry in the hand-off block, then initializing the additional entry with a default value; and
    taking a backup before continuing the boot process and updating the first BIOS and the first reference code to the second BIOS and the second reference code using updated initialization information.

2. The method of claim 1, wherein the difference includes a change in a setup configuration setting.

3. The method of claim 1, wherein the difference includes a change in a platform configuration setting.

4. The method of claim 1, wherein the difference includes a change in memory structure.

5. The method of claim 1, wherein the difference includes a change in an offset value.

6. The method of claim 1, further comprising initializing a setup configuration setting variable to another default value.

7. The method of claim 1, further comprising rolling back a user environment setting.

8. The method of claim 1, further comprising saving a copy of a reference code setup variable.

9. An information handling system, comprising:
a memory device; and
a processor communicatively coupled to the memory device, the processor configured to:
   determine a difference between a first set of initialization information of a first basic input/output system (BIOS) and a second set of initialization information of a second BIOS during a pre-extensible firmware interface initialization phase of a boot process wherein the first set of initialization information is associated with a first reference code and the second set of initialization information is associated with a second reference code;
   create and publish a hand-off block that includes an entry which describes the difference between the first set of initialization information and the second set of initialization information;
   parse the hand-off block during a driver execution environment phase to determine the difference between the first set of initialization information and the second set of initialization information;
   update the first set of initialization information based on the difference during the driver execution environment phase to conform with the second BIOS and the second reference code and if there is additional entry, in the hand-off block, then initialize the additional entry with default value; and
   take a backup before continuing the boot process with the second BIOS using updated initialization information.

10. The information handling system of claim 9, wherein the processor is further configured to initialize a setup configuration setting variable to another default value.

11. The information handling system of claim 9, wherein the processor is further configured to rollback a user configuration setting.

12. The information handling system of claim 9, wherein the difference includes a change in an offset value.

13. The information handling system of claim 9, wherein the difference is a change in a structure definition.

14. A non-transitory computer readable medium including code that when executed performs a method, the method comprising:

determining a difference between a first set of initialization information associated with a first basic input/output system (BIOS) and a second set of initialization information associated with a second BIOS during a pre-extensible firmware interface initialization phase of a boot process, wherein the first set of initialization information is further associated with a first BIOS reference code and the second set of initialization information is further associated with a second reference code;
creating and publishing a hand-off block that includes an entry which describes the difference between the first set of initialization information and the second set of initialization information;
parsing the hand-off block during a driver execution environment phase to determine the difference between the first set of initialization information and the second set of initialization information; and
updating the first set of initialization information based on the difference according to the second BIOS and the second reference code and if there is an additional entry in the hand-off block, then initializing the additional entry with a default value; and
taking a backup before continuing the driver execution environment phase of the boot process and updating the first BIOS and the first reference code to the second BIOS and the second reference code using updated initialization information.

15. The non-transitory computer readable medium of claim 14, further comprising initializing a setup configuration setting variable to another default value.

16. The non-transitory computer readable medium of claim 14, further comprising rolling back a user configuration setting.

17. The non-transitory computer readable medium of claim 14, further comprising saving a user configuration setting.

18. The non-transitory computer readable medium of claim 14, further comprising rolling back a user environment setting.

19. The non-transitory computer readable medium of claim 14, further comprising adjusting an offset value.

20. The non-transitory computer readable medium of claim 14, further comprising further comprising saving a copy of a reference code setup variable.

* * * * *